United States Patent [19]

Hild et al.

[11] 3,971,717

[45] July 27, 1976

[54] CONDITIONING HIGHLY RADIOACTIVE SOLIDIFIED WASTE

[75] Inventors: Werner Hild, Leopoldshafen; Helmut Krause; Knut Scheffler, both of Karlsruhe; Hans Gusten, Speyer; Ernst Gilbert, Karlsruhe; Rainer Köster, Leopoldshafen, all of Germany

[73] Assignee: Gesellschaft fur Kernforschung m.b.H., Karlsruhe, Germany

[22] Filed: May 27, 1975

[21] Appl. No.: 580,962

Related U.S. Application Data

[63] Continuation of Ser. No. 418,939, Nov. 26, 1973, abandoned.

[30] Foreign Application Priority Data

Nov. 24, 1972 Germany............................ 2257737
Sept. 25, 1973 Germany............................ 2348080
Oct. 23, 1973 Germany............................ 2352982

[52] U.S. Cl................................. 210/59; 210/63 R; 210/64; 252/301.1 W
[51] Int. Cl.²............................................ B01J 1/10
[58] Field of Search................... 210/15, 59, 60, 61, 210/18, 62, 63, 64; 252/301.1 W; 423/1-6

[56] References Cited

UNITED STATES PATENTS

| 3,558,483 | 1/1971 | Dodgson............................... 210/62 |
| 3,565,796 | 2/1971 | Levin..................................... 210/18 |
| 3,603,788 | 9/1971 | Miraldi et al.......................... 210/64 |
| 3,723,255 | 3/1973 | Walden et al.......................... 210/15 |
| 3,781,200 | 12/1973 | Hicks.................................... 210/62 |

Primary Examiner—Charles N. Hart
Assistant Examiner—Benoit Castel
Attorney, Agent, or Firm—Spencer & Kaye

[57] ABSTRACT

Solid radioactive waste is incorporated in glass, ceramic or basaltic blocks which are conditioned in waste waters or sludges prior to placement in ultimate storage. The conditioning has the dual benefit of reducing the radioactivity of the radioactive waste and of purifying the waste water or of purifying and facilitating the filterability of the sludge. Such purifying is enhanced by concurrent treatment with oxygen or an oxygen-containing gas and/or with a substance which is readily reduced to radicals.

11 Claims, No Drawings

CONDITIONING HIGHLY RADIOACTIVE SOLIDIFIED WASTE

CROSS REFERENCE TO RELATED APPLICATION

This application is a continuation of Application Ser. No. 418,939, filed Nov. 26th, 1973, now abandoned.

BACKGROUND OF THE INVENTION

Highly radioactive wastes, such as fission-product solutions resulting from processing irradiated nuclear fuels, are converted to solid, stable and substantially water-insoluble products before they are transported to a final storage location in conformance with environmental protection requirements. Various methods are used to solidify highly radioactive liquids, salts or ashes. Liquids are initially processed to form dry residues and are calcined, for example in a spray calciner. The resulting product is mixed with vitrifying substances, melted and filled into a mold for tempering and slow cooling. The calcined, radioactive products are also mixed with substances with which they form, under similar treatment, a ceramic mass or a basaltic mass. The solid molded bodies are then provided with a coating and are stored in closed or abandoned salt mines or in salt caverns built for this purpose. Uncontrolled return of radionuclides into the biocycle is thus made practically impossible.

When cylindrical glass blocks are produced with a diameter of 200 millimeters (mm) and a length of 800 mm, i.e. a volume of approximately 25 cubic decimeters ($dm^3$), a heat of decomposition of 1 kilowatt (kw) per block, i.e. 40 $w/dm^3$ of glass (resulting from incorporated radionuclides) is permissible since this corresponds to a surface temperature of about 400°C for a block stored in air with free convection. The heat output of 1 kw corresponds, for example, to 3.51 kilograms (kg) of a fission-product mixture whose incorporation into the glass block was effected after one year of decay. If a larger quantity of such a fission product mixture were incorporated in one block, the inherent heat would be greater and would unfavorably influence storage in salt. Due to higher surface temperature, the block would render the surrounding salt layer plastic and would thus slowly sink into the salt.

For storing the molded bodies in salt, bores are made in the salt into which the molded bodies are inserted. The quantity of heat transferred from the molded bodies to the salt dictates a certain minimum spacing between bore holes. With a heat output of 1 kw per molded body such minimum spacing is about 10 meters (m).

Solidification of radioactive waste, particularly highly radioactive waste, as well as its transport to an ultimate storage location is very expensive. This expense cannot be avoided, however, in view of the need to protect the environment, and the need for extensive storage facilities. In a circular area with a diameter of about 20 m it is possible to make a maximum of only seven bore holes for the above-noted reasons; this is very unsatisfactory. When projected quantities of fission products are considered, the burden imposed by the lack of sufficient storage facilities is readily apparent. The development of energy generation from nuclear reactors in the Federal Republic of Germany is estimated to reach 20 gigawatt electrical ($Gw_{el}$) for thermal reactors by 1980. This would result in a total fission product quantity of 15.8 tons per year for 1980 and the following years (assuming there is no further increase). Were these fission products to be incorporated in, e.g., a glass mass, a total volume of glass blocks of 111 $m^3$ per year would result.

SUMMARY OF THE INVENTION

The present invention relates to a method for conditioning highly radioactive, solidified waste products which are incorporated in shaped bodies of glass, ceramic or basaltic masses before they are transported to nonpolluting ultimate storage locations.

Highly radioactive solidified waste, incorporated in molded bodies of glass, ceramic or a basaltic mass, is introduced into waste water and/or settling or precipitated sludge from community or industrial systems [in order to sterilize, improve the filterability of and condition (a) the waste water before it is introduced into a receiving stream and (b) the sludge before it is composted[ and is left to remain there until the heat energy produced by the radioactive radiation has been reduced in its order of magnitude to one tenth of the amount available in the molded bodies upon their completion. The molded bodies, which may be sheathed or coated, are alternatively introduced into raw water used for preparing drinking water in order to sterilize it and are left to remain therein until heat energy produced by the radioactive radiation has been reduced in its order of magnitude to one tenth of the amount available in the freshly prepared molded bodies.

An object of the present invention is to find a better way to utilize available ultimate storage locations in salt stocks and to reduce the cost of noncontaminating removal or final storage of highly radioactive waste.

DESCRIPTION OF THE PREFERRED EMBODIMENTS

Nuclear fuel used in a light water reactor until it had burned down to 33,000 mega-watt-days (MWd) per ton, was tested after one year of decay and was found to contain $3.51 \times 10^4$ grams (g) of fission-product mixture per ton of the original used fuel. This corresponds to a heat output of $1.0 \times 10^4$ w/ton produced predominantly by radiating fission product nuclides. In order to reduce the heat output to approximately $1 \times 10^3$ w/ton, about 10 years are required. During the same time, the gamma activity drops by about 20 percent.

Conditioning highly radioactive solidified waste in waste water and/or sludge which must be purified before being introduced into a receiving stream or composted reduces the space required for ultimate storage and thus the cost for noncontaminating removal or final storage of highly radioactive waste. Since, in addition to a reduction in heat output of the molded bodies, the waste water and/or sludge is also conditioned for further purification by the influence of emitted gamma radiation, which kills viruses, bacteria and worm eggs and destroys poisonous organic substances so that further treatment of the waste water or sludge is simpler and more economical, the effective cost of removing the highly radioactive waste and for treating waste water or sludge is further reduced. This additional reduction in cost for the final storage of the radioactive waste becomes particularly evident when, in the cost calculations, the cost for purifying the waste water or sludge is considered without added expense for separate conditioning by gamma radiation. In this way the environmental protection problems are solved in a particularly simple manner even for special, difficult types of waste waters which contain biocides, such as pesticides.

Conditioning waste water which contains biologically resistant organic compounds, however, is not without difficulty; at times the usual efficiency cannot be attained.

In order to maintain a degree of cost reduction (even for waste waters which contain biologically nondegradable organic substances) and thus assure substantially lower total expenditures for removing highly radioactive wastes or further restrict such costs, an embodiment of the present invention provides for permeating waste water (containing biologically resistant organic compounds as contaminants) surrounding the molded body by a stream of air. A stream of oxygen or stream of gas containing oxygen can permeate the waste water instead of the stream of air as long as it is applied so that it is enriched with oxygen at any time when it is in the range of the radiation effect. The introduction of the molded body and of the stream of air into the waste water is used as a preliminary stage for a full biological clarification of the waste water.

In an advantageous embodiment of the present invention the molded body is introduced into waste water which contains at least one contaminant which is a monochlorophenol, a dichlorophenol, a trichlorophenol, a tetrachlorophenol or pentachlorophenol and the waste water is treated in a continuous or discontinuous operation, the molded body remaining in the waste water until a dose of the maximum order of magnitude of $1.5 \times 10^6$ rad (the unit dose of absorbed radiation) has been reached. With continuous operation, a stream of air is introduced upstream of the molded bodies with respect to the direction of flow of the waste water.

If the waste water contains contaminants primarily in the form of aliphatic halo-substituted hydrocarbons, a substantially complete decomposition of these substances is not always assured. In decomposing aliphatic halo-substituted hydrocarbons, OH radicals resulting, inter alia, in water radiolysis are not fully utilized for the decomposition since the OH radicals may react (in addition to the decomposition reaction) by reducing particles, such as hydrated electrons of hydrogen atoms. The reaction of the OH radicals follows the equations:

$$R-CH_2-CH_2-Cl \rightarrow R-CH-CH_2-Cl + H_2O$$

Radicals of the type $R-CH-CH_2-Cl$ hydrolyze only with difficulty so that, upon consumption of the OH radicals, no further compounds result which can be biologically decomposed without difficulty.

In order to maintain or further improve the degree of cost reduction for nonpolluting removal or permanent storage of highly radioactive water which is conditioned, or when molded bodies containing it are conditioned in waste water containing mainly aliphatic halo-substituted hydrocarbon contaminant, an advantageous further embodiment of the present invention provides that the oxygen added to the waste water (effected, e.g., with a stream of air) is added to a concentration which is at most one tenth of the concentration of the contaminant in the waste water and at least one substance which can easily be reduced to radicals is also added to the waste water.

The quantity of above-noted contaminant dissolved in the waste water is in the order of magnitude of ≤ $10^{-3}$ mol per liter. Introduction of substances which are easily reduced to radicals is effected, e.g., by mixing the waste water surrounding the molded body with waste water containing such substances.

According to one embodiment of the present invention, the substance which is easily reduced to radicals and is added to waste water containing halo-substituted organic compounds, is isopropyl alcohol. The mol quantity of added isopropyl alcohol lies in the order of magnitude of ten times the sum of the moles of the halo-substituted compounds in the waste water. In another embodiment of the present invention waste water, containing predominantly aliphatic halo-substituted hydrocarbon contaminant, is charged with one or a plurality of the following halo-substituted aromatic compounds as the substance which is easily reduced to radicals:

I halobenzene of the formula

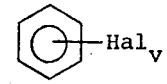

II halophenol of the formula

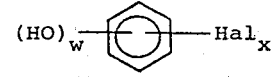

III haloanisole of the formula

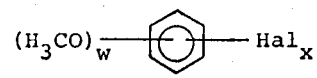

IV polyhalobiphenyl of the formula

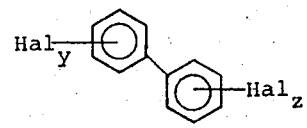

wherein
  each Hal is, independently, chloro (—Cl), bromo (—Br), fluoro (—F) or iodo (—I);
  $v$ is an integer from 1 to 6, inclusive,
  each of $w$ and $x$ is an integer from 1 to 5, inclusive; the sum of $w$ and $x$ being at most 6; and
  each of $y$ and $z$ is, independently, an integer from 1 to 5, inclusive;
in a mole quantity which corresponds (in order of magnitude) to the sum of the moles of the aliphatic halo-substituted hydrocarbon contaminant. Comparable results are obtained when at least one of the benzene rings of any of formulae I through IV is further substituted by one or more aliphatic, e.g. lower alkyl, radicals, particularly by a single alkyl radical having from 1 to 4 carbon atoms, inclusive.

In a further embodiment of the present invention waste water containing mainly aliphatic halo-substituted hydrocarbon contaminant is charged with one or more olefinic halo-substituted compounds (as the substance which is easily reduced to radicals) of one of the formulae:

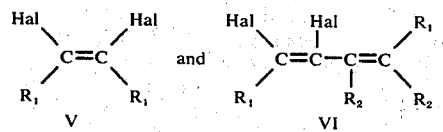

wherein
each Hal is, independently, chloro (—Cl), bromo (—Br), fluoro (—F) or iodo (—I);
each $R_1$ is, independently, a hydrogen atom (—H) or one of the meanings ascribed to Hal; and
each $R_2$ is one of the meanings ascribed to $R_1$, at least one $R_2$ being one of the meanings ascribed to Hal;
in a mole quantity which corresponds in order of magnitude to the sum of the moles of the aliphatic halo-substituted hydrocarbon contaminants. Exemplary olefinic halo-substituted compounds comprise one or a plurality of such compounds as trichloroethylene, tetrachloroethylene and hexachlorobutadiene. To increase the decomposition speed of any of the compounds which are readily reduced to radicals and of aliphatic halo-substituted contaminants, it is advantageous to increase the pH and/or the temperature of the waste water.

Introducing the molded bodies into waste water and/or clarification or precipitated sludge or into raw water for the production of drinking water thus yields the following additional advantages during conditioning of molded (waste) bodies for their ultimate storage.

The effect of the gamma radiation (emitted from the molded bodies) on waste water containing colloids or on clarification or precipitated sludge is to improve filterability; it produces coagulation (precipitation) in addition to sterilization. Condensation of the sludge is effected, and sludge which is suitable for composting is conditioned for such process.

Gamma radiation sterilizes raw water for the production of drinking water without necessitating the use of, e.g., chlorine or chlorine oxide.

The combination of difficultly decomposable compounds with substances which are easily reduced to radicals before or during the introduction of the molded bodies into waste water containing these compounds or the further combination thereof with oxygen raises the G value (indicative of the number of molecules decomposed per 100 ev absorbed radiation energy) which is generally otherwise too low for the decomposition reactions, and the reactivity of the OH radicals, for example is fully utilized.

Radioactive radiation in water produces the following reactive particles:

hydrated electrons ($e_{aq}^-$),
hydrated protons ($H_3O^+$),

-continued
hydrogen atoms (H·),
OH radicals (·OH),
hydrogen peroxide molecules ($H_2O_2$) and
hydrogen molecules ($H_2$).

The G values for particle formation in aqueous oxygen-free solutions are:

| particles | $e_{aq}^-$ | $H_3O^+$ | H· | ·OH | $H_2O_2$ | $H_2$ |
|---|---|---|---|---|---|---|
| G values | 2.8 | 2.8 | 0.6 | 2.7 | ca. 0.7 | ca. 0.5 |

Reduced particles such as H atoms and hydrated electrons react, for example, with organic halo-substituted compounds according to the reaction scheme:

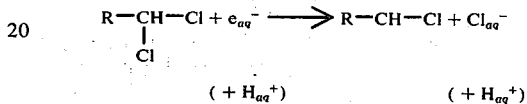

The G values for the chlorine ion formation and thus for the decomposition reactions of the contaminants are equal to or greater than the G values for the attacking reducing particles.

The resulting radicals react with the oxygen to form peroxide radicals which, in subsequent reactions, hydrolyze easily and are thus decomposed further. The addition of oxygen thus increases the G value for the decomposition of halo-substituted compounds. Such halo-substituted compounds include, e.g., halo-substituted benzenes, halo-substituted toluenes, halo-substituted phenols, halo-substituted anisoles, halo-substituted anilines, halo-substituted nitro-aromstics, halo-substituted alkanes ($C_1$ to $C_7$), halo-substituted mono- and di-alkenes, and halo-substituted aliphatic ethers.

OH radicals formed under the influence of the gamma radiation emitted during conditioning of the radioactive solidified waste reduce, e.g., isopropyl alcohol molecules in the waste water to isopropyl radicals. Isopropyl radicals have a high oxidation-reduction potential and thus reduce many halo-substituted compounds again producing radicals in a manner analogous to the equations listed below merely as examples:

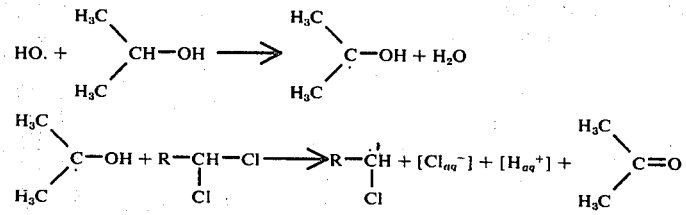

Any residual isopropyl alcohol remaining in the waste water after the decomposition reactions occur is effectively without significance. Due to the very low solubility (in the order of magnitude of $10^{-3}$ mol/l) of halo-substituted hydrocarbons, the added isopropyl alcohol does not ordinarily exceed $10^{-2}$ mol per liter (1); after the decomposition reactions only a very small concentration of isopropyl alcohol remains.

If higher concentrations of halo-substituted hydrocarbon are present in the waste water surrounding the molded bodies, i.e. in undissolved form, the addition of an emulsifying substance (for example waste water containing such emulsifiers) is of use.

Conditioning at higher pH values, for example about pH 9 or higher, increases the rate of hydrolysis of unstable intermediate products resulting from the radicals and thus also the efficiency of the decomposition reactions.

The admixture of, for example, waste water containing aromatic or olefinic halo-substituted compounds to the waste water surrounding the molded waste bodies utilizes the OH radicals and leads to reactions according to the following reaction scheme:

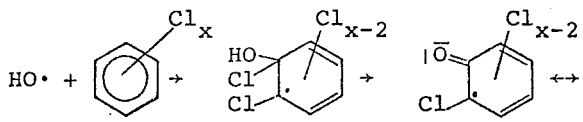 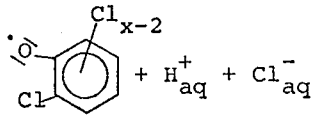

These radicals hydrolyze much easier than R—CH—CH$_2$—Cl radicals. This hydrolysis constitutes a nucleophilic attack of H$_2$O or OH$^-$ particles. Thus an increase in temperature accelerates the hydrolysis and thus the decomposition, i.e. the efficiency of the decomposition is increased.

The use of radioactive irradiation in the treatment of waste water and sludge (for disinfection and changes in the organic compounds) is known (D.S. Ballantine: "Potential Role of Radiation in Waste-Water Treatment", *Isotopes and Radiation Technology*, Vol. 8, No. 4, Summer 1971, pages 415–420); however, the manufacture and use of such energy sources, e.g. cobalt-137 and cesium-137, are so uneconomical or expensive for general conditioning of waste water, sludge and raw water that their use is precluded for these purposes. However, the use of molded bodies which still require conditioning, e.g. reduction in heat emitted and external temperature, before they can be transported to ultimate storage is either completely free of cost or reduces the costs of waste processing. In this way, two completely different problems are solved with the process of the present invention. Furthermore, an increase in safety is assured for handling the molded bodies during transport to their ultimate storage location.

A further advantage of the process according to the present invention is the high degree of safety which is assured by the resistance of the molded bodies or of the molded body material to water and chemical solutions, i.e. as compared with the worst possible accident that could happen with the use of other radiation sources where, under certain circumstances, radionuclides could leak into the waste water, the sludge or the drinking water. Upon unintentional comminution of a molded body it is sufficient, for example, to provide a sand trap to remove resulting fragments easily and rapidly. A dangerous intrusion of radionuclides into the biocycle is thus prevented.

Throughout the subject disclosure references to Hal, halo or halogen include each or any of the halogens, chlorine, bromine, fluorine and iodine, unless otherwise limited. Compounds containing halo-substitution comprise compounds wherein each halogen atom is of the same halogen and compounds containing different halogen substituents, as well as mixtures of either or both of the foregoing.

The following examples serve to explain the present invention. They are entirely illustrative in nature and in no way limit the nature or scope of the invention.

EXAMPLE 1

The storage of glass blocks having a diameter of 200 mm and a length of 800 mm in a salt stock requires spacing bores accommodating the glass blocks at about 10 m intervals when the permissible quantity of fission product mixture (originating from a light water reactor fuel element which has been burnt to about 33,000 MWd/ton) incorporated therein has a heat output of 40 w/dm$^3$ of glass and the storage takes place soon after manufacture of the glass blocks without conditioning (introducing and maintaining the glass-blocks in waste water or sludge). With conditioning for more than ten years in a waste water or sludge container with continuous or discontinuous waste water or sludge changes, the heat output drops to about 4 w/dm$^3$ of glass. The spacing for blocks conditioned in such a manner with the same originally incorporated quantity of fission products is only less than one half the previously required minimum spacing. This means that in a salt surface previously accommodating seven bores, ten times the number of bore holes can be made for conditioned blocks.

Test results are provided to illustrate the efficiency of the decomposition of the contaminants.

EXAMPLE 2

In a glass flask with a frit for the intake of air aqueous solutions (1 liter of each having an initial concentration of 10$^{-3}$ mol/l of substance) were irradiated (at atmospheric pressure and at room temperature by means of a radiation source having an output of 1.88 × 10$^{+5}$ roentgens per hour (r/h)) as model solutions of waste water with biologically resistant organic compounds. Glass-blocks containing a mixture of gamma-emitting fission nuclides were used.

In the respective solutions the substance is:
1. 4-monochlorophenol;
2. 2,4-dichlorophenol;
3. 2,4,6-trichlorophenol;
4. 2,3,5,6-tetrachlorophenol;
5. pentachlorophenol.

The sequence of the radiochemical decomposition of these substances was observed under oxidizing conditions with the aid of the following analytical procedures:

gas chromatography: the decrease in chlorophenols;
spectral photometry: proof of phenolic functions;
ion-specific chloride electrode: proof of chloride;
gravimetry: proof of the decomposition end product, oxalic acid.

The test results confirmed that, in all cases, gamma radiation of the chloro-substituted phenols in aqueous solution under oxidative conditions leads to complete dechlorination. With a dose of 1.5 × 10$^6$ rad complete dechlorination is achieved, for example, with monochlorophenol. The chlorinated phenols are radiochemically more efficiently decomposed with increasing chlorine content. Thus with an increasing number of chlorine atoms in the molecule the dose of irradiation required to effect complete dechlorination is continuously decreased. For tetrachlorophenol and pentachlorophenol a dose of $0.4 \times 10^6$ rad is sufficient. Moreover, the biologic oxygen requirement (BOR) which, before irradiation, was 0 increases with increased duration of irradiation until it reaches its maximum at complete dechlorination. The phenolic functions decrease in parallel with increased dose and advancing dechlorination.

The G values (the G value indicates the number of formed or decomposed molecules per 100 ev of absorbed radiation energy) for the decrease of the corresponding chlorophenol and for the formation of chloride ions or hydrogen peroxide, respectively, in solution are:

|  | Decrease in phenol | G values for Chloride formation | Formation of $H_2O_2$ |
|---|---|---|---|
| 4-chlorophenol | 2.4 | 1.4 | 1.7 |
| 2,4-dichlorophenol | 3.2 | 3.8 | 1.8 |
| 2,4,6-trichlorophenol | 4.4 | 6.1 | 1.0 |
| 2,3,5,6-tetrachlorophenol | 4.8 | 6.7 | — |
| pentachlorophenol | 4.8 | 9.9 | — |

With all chlorinated phenols the main decomposition product is oxalic acid, the yield of oxalic acid increasing for pentachlorophenol to more than 90% with reference to the TOC (total organic carbon, i.e. the total content of organically bound carbon) value after irradiation. Further decomposition products are $CO_2$ and substances containing keto groups.

In contradistinction to photochemical primary processes, the energy of ionizing radiation is not selectively absorbed. Ionizing radiation of aqueous solutions primarily decomposes the water. Only with the onset of subsequent reactions of solvated electrons and primary radicals resulting from water radiolysis, e.g. OH radicals, with dissolved substances are the latter attacked and decomposed.

In a further exemplary experiment technical waste water from an industrial plant containing, as its main component of organic substances, 2,4-dichlorophenol and 4-chloro-p-cresol (together they constitute 90% by weight of the organic components) was treated under the conditions outlined above. The contaminants therein were also completely dechlorinated.

An addition of salts to this technical waste water had no influence on the dechlorination. The following salts and NaOH were examined in the concentrations listed:
NaCl — $10^{-3}$ m/l;
NaCl — $10^{-1}$ m/l;
$KNO_3$, $K_2SO_4$, NaOH, each at $10^{-1}$ m/l.

The G values for the dechlorination were not influenced by such a load of salt in the waste water. It is thus possible to dilute organic waste water with salt-containing waste water or with alkali or acid containing waste water, respectively, in industrial operation.

EXAMPLE 3 a. An aqueous, oxygen-free solution of carbon tetrachloride with a concentration of $CCl_4$ of $10^{-3}$ mol/liter and a pH of 7 was irradiated with a radiation dose of about $10^4$ rad. The then measured G value for the formation of hydrated chlorine ions ($Cl_{aq}^-$), which corresponds to the G value for the decomposition of $CCl_4$ by hydrated electrons and hydrogen atoms, was approximately 3.4.

b. The same oxygen-free solution was brought to a pH of 11 with a sodium hydroxide solution and was then treated in the same manner, A $G(Cl^-)_{CCl}$ of about 5.5 resulted. This constitutes an increase (in the G value by the factor 1.6 with an increase in the pH of the solution.

c. The same neutral solution as in (a), but with an oxygen concentration of about $10^{-4}$ mol/l, was treated as in (a). A $G(Cl^-)_{CCl}$ of about 8.0 was noted. This means an increase in the G value by the factor of about 2.4.

EXAMPLE 4

An isopropanol solution is added to an aqueous oxygen-free solution of $CCl_4$ (about $10^{-3}$ mol/l) so that the resulting aqueous solution has an i-propanol concentration of about $10^{-20}$ mol/l. This solution was irradiated with two different radiation intensities and for different durations:
a. with 700 rad for 1 $\mu$sec;
b. with $1 \times 10^4$ rad for 20 minutes.

Compared to the G value of a solution without the addition of i-propanol (as in Example 3a) the $G(Cl^-)_{CCl}$ value increased in irradiation case (a) by at least a factor 2; in irradiation case (b), by a factor 10 or more.

EXAMPLE 5

During the irradiation of an aqueous, oxygen-free solution of pentafluorobenzene with 1000 rad for 2 $\mu$sec a $G(F^-)$ value of 5.5 is found, which corresponds to the G value of the attacking OH radicals. If the same solution is irradiated for a period of 20 minutes with $10^4$ rad in the presence of $O_2$, the resulting G value will be higher by about one order of magnitude.

It will be understood that the above description of the present invention is susceptible to various modifications, changes and adaptations and the same are intended to be comprehended within the meaning and range of equivalents of the appended claims.

We claim:

1. A method for conditioning highly radioactive, solidified waste incorporated in a molded glass, ceramic or basaltic body prior to nonpolluting ultimate storage, the method comprising introducing the molded body into waste water, containing a biologically-resistant organic chlorophenol contaminant, from a community or industrial system, introducing a stream of air into said waste water to produce peroxide radicals which attack the chlorophenol and bring about decomposition of the chlorophenol, and maintaining the body in the waste water until the heat output produced by radioactive irradiation from said body is reduced to about one tenth of the amount of heat initially produced by the molded body thereby purifying said waste water.

2. A method according to claim 1 wherein the waste water contains at least one contaminant selected from the group consisting of a monochlorophenol, a dichlorophenol, a trichlorophenol, a tetrachlorophenol and pentachlorophenol.

3. A method according to claim 2 wherein, in continuous operation, the stream of air is introduced upstream of the molded body with respect to the direction of flow of the waste water.

4. The method according to claim 2 which comprises maintaining the molded body in the waste water until a dose of from $0.4 \times 10^6$ to $1.5 \times 10^6$ rad is imparted to the waste water.

5. A method according to claim 1 wherein the highly radioactive, solidified waste is incorporated in a molded glass body.

6. A method according to claim 1 which comprises maintaining the molded body in the waste water continuously until the heat output produced by radioactive irradiation from said body is reduced to about one tenth of the amount of heat initially produced by the molded body.

7. A method according to claim 1 which compriss maintaining the molded body in the waste water discontinuously until the heat output produced by radioactive irradiation from said body is reduced to about one tenth of the amount of heat initially produced by the molded body.

8. A method for conditioning highly radioactive, solidified waste incorporated in a molded glass, ceramic or basaltic body prior to nonpolluting storage, the method comprising
introducing the molded body into waste water from a community or industrial system, said waste water containing biologically-resistant organic contaminants which are mainly aliphatic halo-substituted alkane hydrocarbon compounds,
introducing (a) a stream of air to effect an oxygen concentration in the waste water which corresponds to at most one-tenth of the organic contaminant concentration in the waste water and (b) at least one substance which is reduced to radicals in the waste water more easily than the organic alkane contaminants to bring about the formation of radicals which attack the contaminants and with the aid of peroxide formation resulting from the introduction of the air causes decomposition of the organic contaminants, and the substance which is more easily reduced to radicals comprises 1. isopropyl alcohol in a mole quantity which corresponds in order of magnitude to ten times the sum of the moles of the halo-substituted organic compounds, or
2. at least one aromatic halo-substituted compound selected from the groups consisting of
I halobenzene of the formula

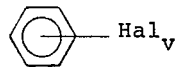

II halophenol of the formula

III haloanisole of the formula

IV polyhalobiphenyl of the formula

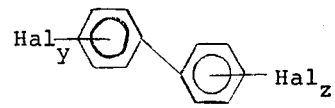

wherein
each Hal is, independently, chloro (—Cl), bromo (—Br), fluoro (—F) or iodo (—I);
$v$ is an integer from 1 to 6, inclusive;
each of $w$ and to $x$ is an integer from 1 to 5, inclusive; the sum of $w$ and $x$ being at most 6; and
each of $y$ and $z$ is, independently, an integer from 1 to 5, inclusive;
in a mole quantity which corresponds in its order of magnitude to the sum of the moles of the aliphatic halo-substituted alkane hydrocarbon contaminant, or 3. at least one halo-substituted olefin of one of the formula

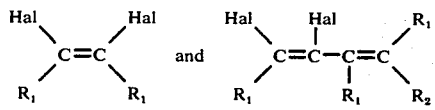

wherein
each Hal is, independently, chloro (—Cl), bromo (—Br), fluoro (—F) or iodo (—I);
each $R_1$ is, independently, a hydrogen atom (—H) or one of the meanings ascribed to Hal; and
each $R_2$ is one of the meanings ascribed to $R_1$, at least one $R_2$ being one of the meanings ascribed to Hal; in a mole quantity which corresponds in its order of magnitude to the sum of the moles of the aliphatic halo-substituted alkane hydrocarbon contaminant; and
maintaining the molded body in the waste water until the heat output produced by radioactive irradiation from said body is reduced to about one-tenth of the amount of heat initially produced by the molded body thereby purifying said waste water.

9. A method according to claim 8 which comprises mixing said waste water surrounding the molded body with a second waste water containing the said at least one substance which can easily be reduced to radicals to thereby introduce said at least one substance into the waste water surrounding the molded body.

10. A method according to claim 8 wherein the substance is a halo-substituted olefin and is at least one compound selected from the group consisting of a trichloroethylene, tetrachloroethylene and hexachlorobutadiene.

11. A method according to claim 8 which comprises increasing the organic contaminant decomposition speed by increasing the pH and the temperature of the waste water.

* * * * *